2 Sheets—Sheet 1.

H. INMAN.

PAPER BOX COVERING AND TRIMMING MACHINE.

No. 10,286. Reissued Feb. 13, 1883.

Attest:
Walter Middleton
F. L. Middleton

Inventor
Horace Inman

2 Sheets—Sheet 2.

H. INMAN.

PAPER BOX COVERING AND TRIMMING MACHINE.

No. 10,286. Reissued Feb. 13, 1883.

Attest
Walter Donaldson
F. L. Middleton

Inventor
Horace Inman

UNITED STATES PATENT OFFICE.

HORACE INMAN, OF AMSTERDAM, NEW YORK.

PAPER-BOX COVERING AND TRIMMING MACHINE.

SPECIFICATION forming part of Reissued Letters Patent No. 10,286, dated February 13, 1883.

Original No. 253,711, dated February 14, 1882. Application for reissue filed November 29, 1882.

*To all whom it may concern:*

Be it known that I, HORACE INMAN, of Amsterdam, in the county of Montgomery and State of New York, have invented certain new and useful Improvements in Paper-Box Covering and Trimming Machines; and I do hereby declare that the following is a full, clear, and exact description of the invention.

This invention relates to that class of machines employed for automatically covering boxes with an outer coating or surface of paper, cloth, &c.

The invention consists, first, in bringing the strips together, causing them to overlap and applying them to the box in one operation while the paste is moist, whereby the strips are caused to adhere to the box and to each other at the same time and by the same movement.

Second. It consists in lateral adjustments for the guides, whereby the machine is adapted to different widths of strips.

Third. It consists in lateral adjustments for the box in order to bring it into alignment with the strips.

Fourth. It consists of details of construction.

The apparatus in which my invention is embodied is shown in the accompanying drawings, in which—

Figure 1:
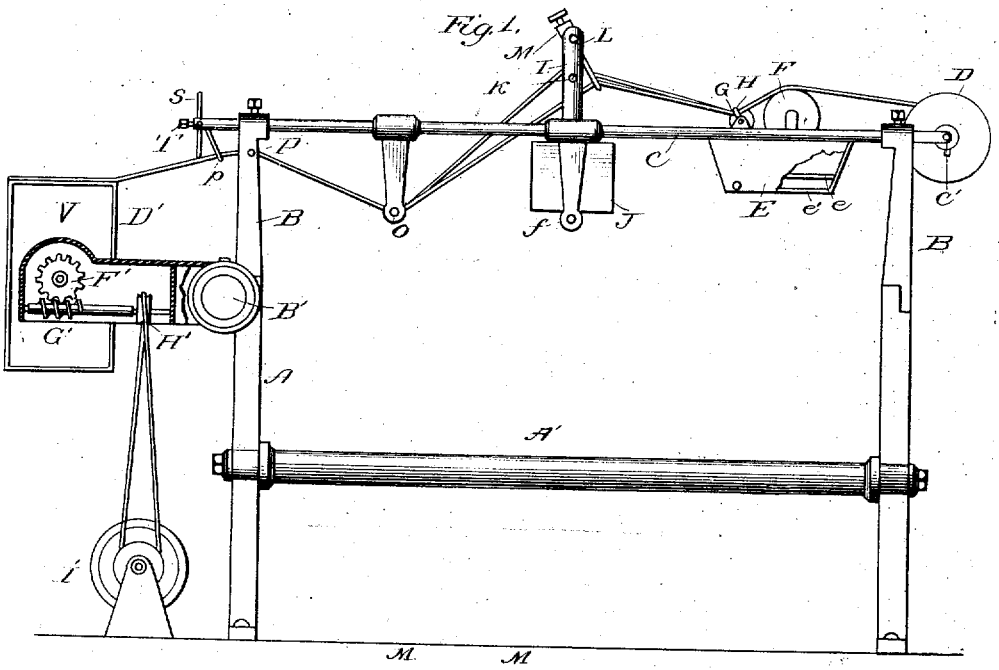
Figure 2:
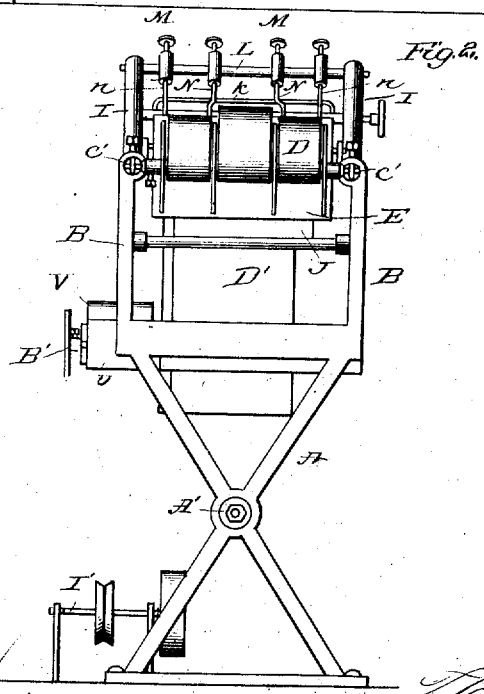
Figure 3:
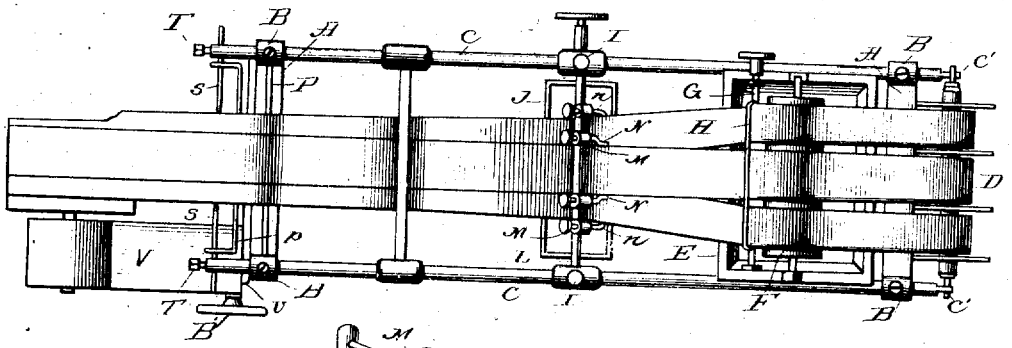
Figure 4:
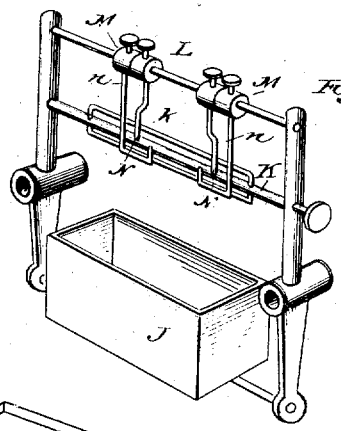
Figure 5:
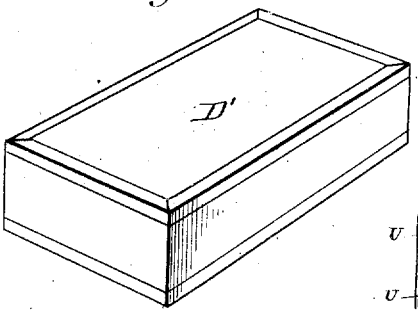
Figure 6:
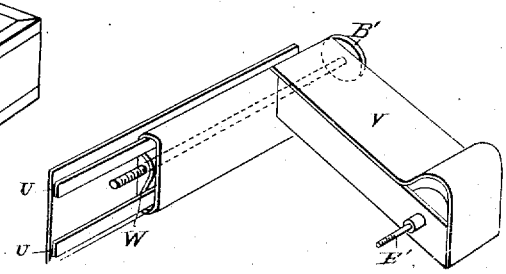

Figure 1 is a side elevation of my apparatus; Fig. 2, an end elevation, looking toward the end of the machine carrying the reel on which the paper, cloth, or other covering material is wound. Fig. 3 is a plan or top view of the machine. Fig. 4 is a detail perspective view of the standards which sustain a paste or glue drip pan or tank, the transverse bar for supporting the paper, and the guiding points or fingers. Fig. 5 is a perspective view of a box, showing the covering and trimming applied thereto; and Fig. 6, a detail perspective view of the carriage to which the form is secured and the track on which said carriage travels.

The machine, as shown, is supported on legs A, which are made in any convenient or desirable form and of any material found most suitable for the purpose, (preferably of cast-iron,) and which are connected or otherwise braced together about midway their height by a rod or bar, A′, their lower ends being firmly secured to the floor. The upper extremities of these legs or standards are provided with vertical extensions B. These extensions are provided with suitable apertures and set-screws for the reception and retention of the bars or ways C, one end of each of the latter being also bored out, as indicated at C′, for the purpose of receiving the journals of a reel, D. This reel is constructed of a series of disks strung on a shaft a short distance apart, forming deep grooves or passes in which the several strips of covering material or paper are wound.

The letter E indicates a paste tank or vessel having a double bottom, for a purpose hereinafter named, made of any suitable material, resting at each of its sides on the said bars C. Immediately above said tank is journaled a paste-delivering roller, F, adapted to come down a short distance within the said tank and engage the glue or paste therein, for a purpose hereinafter more fully set forth. At one end, on the upper side of this tank E, is suitably journaled a cross-shaft, G, which is provided with a link, H, between which and the said bar the paper is adapted to travel, the object of which is to remove from the paper all surplus glue or paste, at the same time spreading and leaving a sufficient quantity for the purpose intended. About midway the said bars C, and fitting smoothly thereon, is a pair of standards, I I, connected at their lower extremities by a cross-rod, which serves to support a tank or pan, J, which catches any paste that may be removed or scraped from the paper during its passage between said standards. At a point above the bars C C another cross-shaft, K, Fig. 4, is journaled to these standards, having a link, *k*, projecting from each side thereof, between the lower of which links and the shaft K the two outer strips of paper (or those known as "trimmings") are adapted to pass, while between this shaft and the upper link the covering proper travels. Near the top of these standards I I is a further cross-shaft, L, having strung thereon a series of heads or blocks, M M, the two inner of which carry depending fingers or guides N N, which embrace the edges of the covering material and serve to guide the same over the said cross-shaft K, the latter being intended to separate the covering material from the side strips or trimming.

The two outer heads or blocks are also provided with depending fingers or guides *n n*, having horizontal extensions, which fit under the outer strips or trimming for the purpose of guiding said strips in their proper course, and also for bringing them nearer together, in order to effect a lap between them and the covering. Each of these heads or blocks is provided with a set-screw for holding them adjustably in place. Along the bars C C is a further pair of standards, which are suitably bared to fit the bars, and which depend downwardly a short distance, supporting a rod, O, under which the covering and trimming pass and at which point they are made to bear firmly against one another, thus serving to unite them together by means of the paste or glue with which the lower side of the covering is coated.

The letter P indicates another supporting bar or rod, located between upper extensions of one of the legs, which, in connection with the rod *p*, supports the covering and trimming which have now become united, as they pass between the guides S S, adjustably journaled to the bars C C, the latter having set-screws T T for retaining the guides in proper place. At the end of the frame and outside of the legs is fixed a track or way, on which slides a carriage, V. The carriage is adjusted on the ways U U by means of a threaded rod having a milled head, B′, the end of the rod working in a lug, W, in the end of the frame. As the form D′, which carries the box, is supported in the end of the carriage, it may be adjusted by turning the milled head B′ to bring said form into line with the strip. This form is secured to a transverse shaft, E′, journaled in the carriage before mentioned, and is rotated by means of a spur-wheel, F′, mounted on said shaft, and meshing with a worm, G′, which also has its bearings in the said carriage. The letter H′ indicates a grooved wheel mounted rigidly on the shaft of this worm, which receives a rotary motion by means of belt passing over the some and connecting with a suitable driving mechanism, I′, located in close proximity to the machine, and provided with such auxiliary appliances as to render it completely under the control of the operator, permitting him to start and stop the said form at will.

The operation of my machine may be readily understood by the following description in connection with the foregoing: The reel D being supplied with the covering and trimming material, (usually paper,) the free ends thereof are passed over the paste-roller F and through the space between the shaft G and the link H, by which shaft and link the paste is properly spread. The covering is then passed between the shaft K and link *k*, and the trimming below said shaft, and over the lower link *k*, after which they unite at the cross-bar O, having been caused to lap each other by means of the fingers *n n* pressing against the outer edges of the said strips of trimming, and thus continue on and over the supports P and *p* and between the final guides S S until the free end is attached or stuck to the box to be covered. The operator then rotates the form D′, thus revolving the box and permitting of a continuous wind of the covering around the box, that part known as the "trimming" being pressed down over the edges of the said box.

It will be noticed that during the passage of the covering through the machine any surplus paste which may happen to adhere thereto, after having been applied by the paste-roller F, will be removed by the shaft K and links *k* and caught by pan J.

The paste-tank is provided with a double bottom, *e e′*, the space between which is charged with steam or other heating agent to prevent congealing of the paste.

The tension of the covering material and trimming is regulated by changing the relative position of the paste-roller F, standards I I, and rod O, each of which is adapted to slide independently of the other on the bars C C, their weight being such as to retain them in any fixed position without the aid of any further fastening. The covering and trimming may be of the same or different colors.

Having thus described my invention, what I claim is—

1. The described method of covering boxes, consisting in simultaneously winding upon the box a plurality of strips with their pasted sides all facing one way, and with the strips overlapping, all substantially as described.

2. An apparatus for applying simultaneously a plurality of strips to a box consisting of mechanism for holding and turning the box, a reel for the strips, pasting mechanism, and guiding mechanism for the several strips, whereby they are caused to overlap, and suitable supporting-frame, all substantially as described, whereby the strips are pasted, overlapped, and wound upon the box, as set forth.

3. An apparatus for applying simultaneously a plurality of strips to a box consisting of suitable supporting-frame, mechanism for holding and turning the box, a reel for the strips, pasting mechanism, and laterally-adjustable guiding mechanism for the several strips, all substantially as described.

4. An apparatus for applying strips to a box consisting of suitable supporting-frame, laterally-adjustable mechanism for holding and turning the box, a reel for the strips, pasting mechanism, and guiding mechanism, all substantially as described.

5. In a machine for covering boxes, the combination, with the legs and the supporting-bars, of a feeding-reel, bearing-covering, and trimming-strips, the paste-tank, and paste-roller, the standards with their guiding and supporting devices, and the cross-bar and guides for uniting, supporting, and guiding the covering and trimming strips, substantially as set forth.

6. In a machine for covering boxes, the supporting-frame, in combination, with the paste-tank carrying a paste-roller, the standards with their guiding and supporting devices, and the cross-bar for uniting the covering and trimming, the said tank, standards, and uniting cross-bar being adapted to slide on the supporting-bars, whereby their relative distance is changed and a proper tension of the covering material maintained, substantially as shown and described.

7. In a machine for covering boxes, the combination, with the devices, substantially as described, for feeding, pasting, guiding, supporting, and uniting the covering material, of a lateral adjustable carriage carrying a revolving form and provided with mechanism for automatically rotating the same, substantially as shown and described.

8. In a machine for covering boxes of the character herein described, adapted to manipulate a plurality of covering and trimming strips of paper, &c., the combination of the standards I I, shaft K, having a link, *k*, and shaft L with heads M M, and fingers or guides N *n* for guiding and lapping the strips, as shown and described.

HORACE INMAN.

In presence of—
F. L. MIDDLETON,
L. W. SEELY.